United States Patent [19]
Bragg

[11] Patent Number: 5,313,996
[45] Date of Patent: May 24, 1994

[54] WHEEL HAVING SPOKE-INTEGRATED TIRE INFLATION PASSAGEWAY

[76] Inventor: Paul Bragg, 794 Boc Cir. NW., Palm Bay, Fla. 32907

[21] Appl. No.: 844,501

[22] Filed: Mar. 2, 1992

[51] Int. Cl.[5] .................................... B60B 1/00
[52] U.S. Cl. ........................... 152/427; 141/4; 141/38; 301/5.24; 301/104
[58] Field of Search ............ 152/415, 416, 417, 418, 152/427; 141/38, 4; 301/5.24, 104

[56] References Cited

U.S. PATENT DOCUMENTS

| | | | |
|---|---|---|---|
| 508,621 | 11/1893 | Kirk et al. | 152/427 X |
| 1,011,987 | 12/1911 | Minor et al. | 152/427 X |
| 1,418,557 | 6/1922 | Gauntt | 152/415 X |
| 1,425,623 | 8/1922 | Anderson | 152/427 X |
| 1,452,284 | 4/1923 | Steinmetz | 152/427 X |
| 1,478,852 | 12/1923 | Gauntt | 152/427 X |
| 1,487,831 | 3/1924 | Barber | 152/427 |
| 1,693,084 | 11/1928 | Kraft | 152/427 |
| 2,066,729 | 1/1937 | Hobb | 301/5.24 |
| 2,097,748 | 11/1937 | Von Bon Horst | 152/427 X |
| 2,742,075 | 4/1956 | Courchesne | 152/418 |
| 2,988,126 | 6/1961 | Wells et al. | 152/427 |
| 3,157,219 | 11/1964 | Dimin et al. | 152/427 |

Primary Examiner—Michael W. Ball
Assistant Examiner—Francis J. Lorin
Attorney, Agent, or Firm—Charles Wands

[57] ABSTRACT

The problem of a visible, rim-mounted valve stem for inflating a customized wheel-mounted tire is obviated by a wheel configuration that translates the tire inflation location from a valve stem mounted on the wheel rim to a hub location where a readily accessible tire inflation port can be effectively hidden beneath a locking center cap, making the access port tamperproof. A tire inflation passageway is integral with a spoke that connects the wheel hub to the wheel rim. In a preferred embodiment the wheel is a unitary cast structure, with the tire inflation passageway integrally cast as part of one of the spokes. The hub portion of the wheel has an inflation access port in fluid communication with the tire inflation fluid passageway, thereby providing for the application of pressurized air to the fluid passageway, so that inflation air flowing therethrough may be supplied to the interior of a tire mounted on the wheel rim and thereby control the tire pressure of the tire.

10 Claims, 3 Drawing Sheets

WHEEL HAVING SPOKE-INTEGRATED TIRE INFLATION PASSAGEWAY

FIELD OF THE INVENTION

The present invention relates in general to pressurized tire wheels, such as stylized wheels for mounting automobile tires and the like, and is particularly directed to a spoke-mounted arrangement for inflating the tire so as to eliminate the use of a valve stem projecting from the rim of the wheel.

BACKGROUND OF THE INVENTION

Pressurized tire wheels, such as those for mounting wheels to an automobile and the like, customarily have a hole formed in the rim of the wheel for receiving a valve stem through which a tire mounted on the rim of the wheel is inflated. Such a wheel configuration is diagrammatically illustrated in FIG. 1, which shows a valve stem 11 projecting along a radial line 13 toward the hub 15 of the wheel 10 proper and standing inwardly or offset from the rim 17 of the wheel a sufficient distance to allow a tire inflation head 21 to engage the valve stem and apply air under pressure to the interior of a tire 23 that is mounted on the wheel rim. For customized/stylized automobiles, where hardware configuration is a significant aspect of its utility function, the rim-mounted valve stem not only diminishes the appearance of the wheel, particularly one having stylized spokes, shown at 25, but often requires the addition of unsightly counter-balancing weights 27 on opposed locations of the wheel rim. Efforts to prevent the valve stem from detracting from the aesthetic appearance of the wheel have involved locating the valve stem directly behind a spoke, as shown by dotted lines 31, so that the valve stem is not visible from the outside. Unfortunately, such positioning of the valve stem is a considerably impractical solution to the problem, as it impedes access to the valve stem, requiring the user to reach around and behind a spoke to inflate the tire.

SUMMARY OF THE INVENTION

In accordance with the present invention, the above-described problem of a visible, rim-mounted valve stem for inflating a customized wheel-mounted tire is obviated by a new and improved wheel configuration that translates the tire inflation location from a valve stem mounted on the wheel rim to a hub location where a readily accessible tire inflation port can be effectively hidden from view. For this purpose, the wheel according to the present invention dispenses with the customary valve stem and employs instead a tire inflation fluid (air) passageway which is integral with a spoke that connects the wheel hub to the wheel rim. In a preferred embodiment the wheel is a unitary cast structure, with the tire inflation passageway integrally cast as part of one of the spokes. The hub portion of the wheel has an inflation access port in fluid communication with the tire inflation fluid passageway, thereby providing for the application of pressurized air to the fluid passageway, so that inflation air flowing therethrough may be supplied to the interior of a tire mounted on the wheel rim and thereby control the tire pressure of the tire. The tire inflation port is located adjacent to wheel hub mounting holes that are configured to receive and be mounted upon respective threaded wheel mounting rod members and preferably comprises a tapped hole that receives a tire pressure valve stem member. The fluid passageway may take the form of a bore within a spoke or a cast passageway along the rear surface of a spoke. By having the passageway cast integrally with the spoke along its rear surface, the mass distribution of the spoke is essentially the same as that of the other spokes, so that wheel remains balanced. A locking hub cover or the like may serve to conceal the access port at the center of the wheel, making the tire inflation port tamperproof.

DETAILED DESCRIPTION

Figure 1:
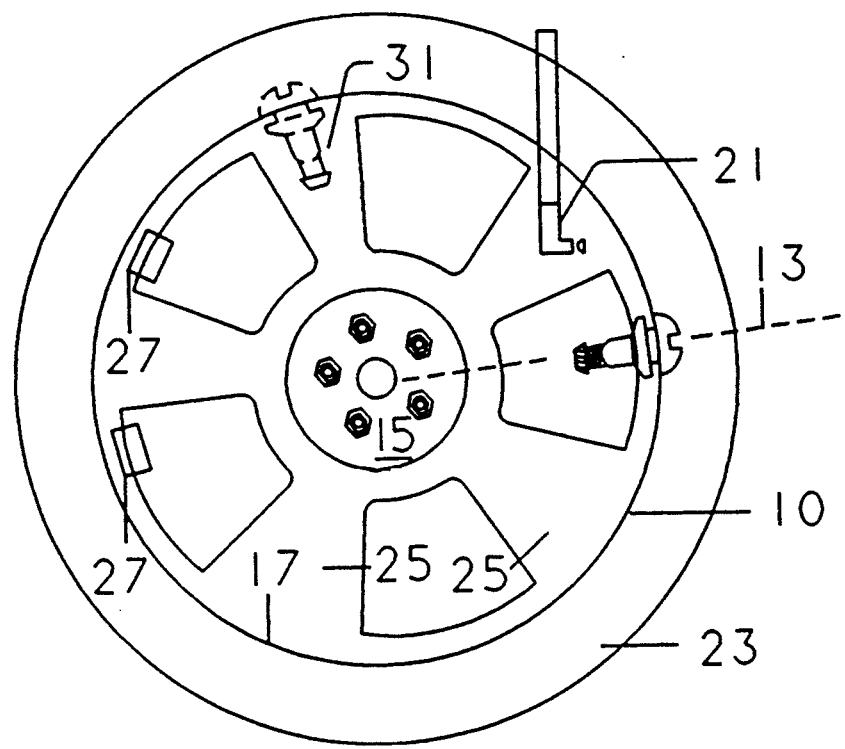
FIG. 1 is a diagrammatic illustration of a custom automobile wheel having a conventional rim-mounted valve stem for inflating the tire that is mounted around the wheel rim.
Figure 3:
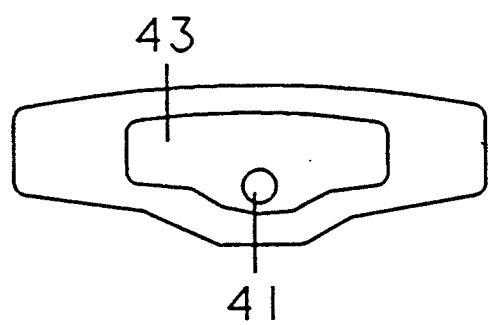
FIG. 3 is a cross-sectional view of a spoke of the wheel of FIG. 2.
Figure 2:
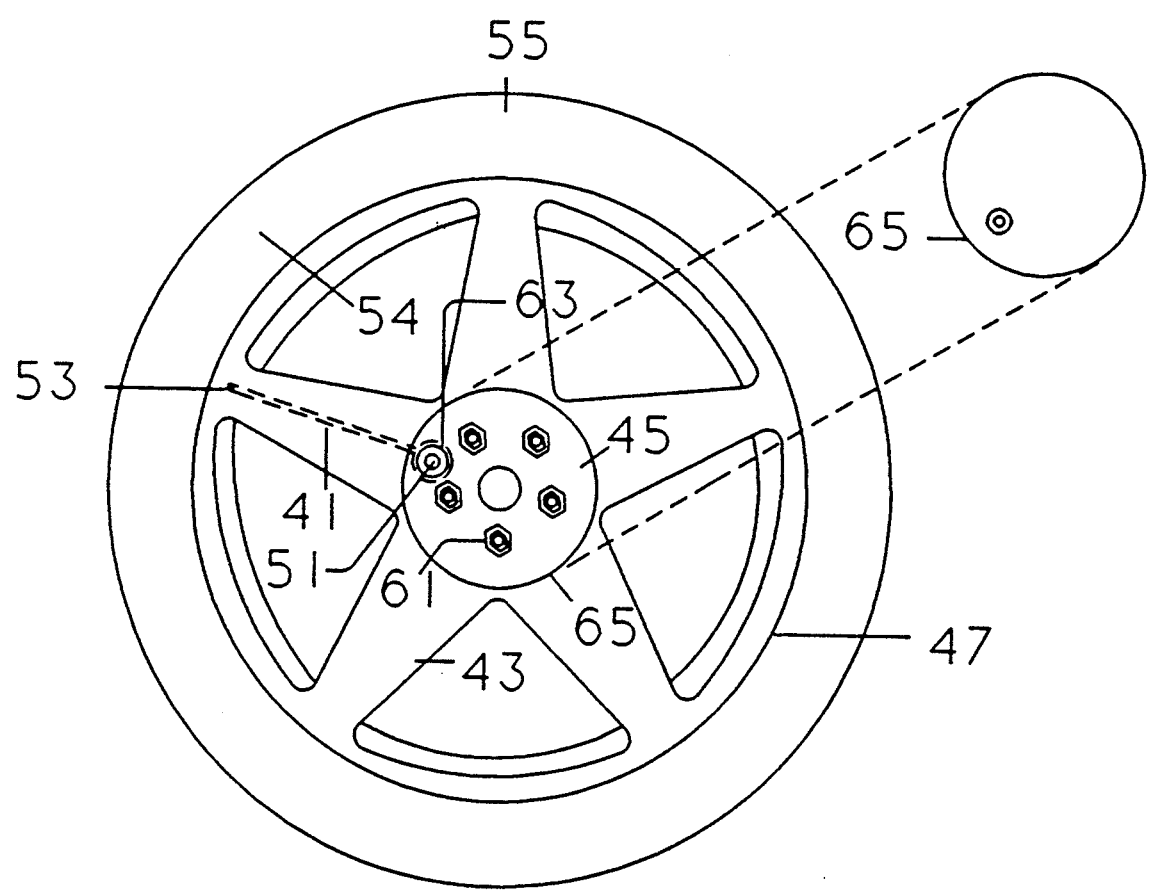
FIG. 2 is a diagrammatic front view of a custom automobile wheel having a spoke-integral tire pressure passageway in accordance with the present invention.
Figure 4:
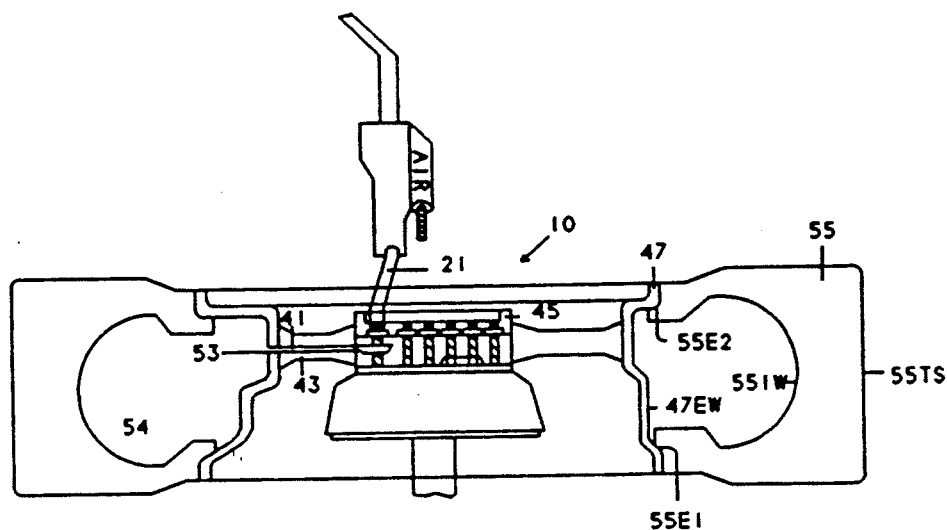
FIG. 4 is a diagrammatic cross-sectional side view of the custom automobile wheel of FIG. 2 mounted on a wheel shaft.
Figure 5:
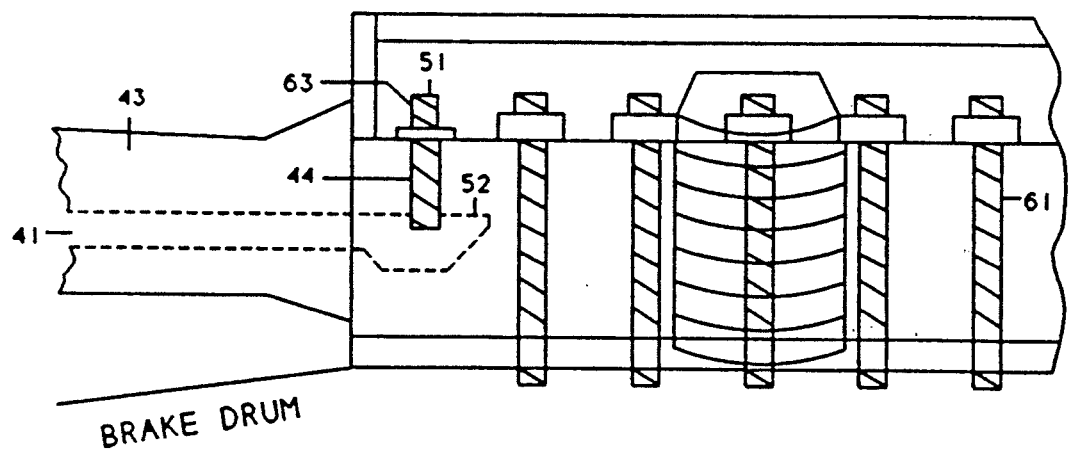
FIG. 5 is an enlarged portion of the diagrammatic cross-sectional side view of the custom automobile wheel of FIG. 4.

An improved 'stylized' automobile wheel in accordance with an embodiment of the present invention is diagrammatically shown in FIGS. 2–5, as comprising a tire inflation fluid (air) passageway 41 which is integral with a spoke 43 that connects the wheel hub 45 to the wheel rim 47. In a preferred embodiment the wheel is a unitary (e.g. cast) structure, with the tire inflation passageway 41 being integrally cast as part of one of the spokes 43. The hub portion 45 of the wheel has an inflation access port 51 in fluid communication with a first end 52 of the tire inflation fluid passageway 41, thereby providing for the application of pressurized air to the fluid passageway, so that inflation air flowing therethrough to a second end 53 of passageway 41, terminating at the rim of the wheel, may be supplied to the interior portion 54 of a tire 55 mounted on the wheel rim and thereby control the tire pressure of the tire. As shown in FIG. 4, tire 55 is tubeless, having an exterior tread surface 55TS, which is engageable with a road surface, and an interior wall surface 55 IW, such that an interior cavity portion 54 of the tire 55 is bounded by the interior wall surface 55 IW of the tire itself and exterior wall 47 EW of the wheel rim 47. Respective rim-engageable edge portions 55E1 and 55E2 of the tire are captured against the wheel rim 47 as shown, such that the interior cavity 54 has its perimeter defined by the outer surface 47EW of the rim and the interior wall surface 55IW of the tire 55. Thus, with the second end of fluid passageway 53 terminating at the wheel rim 47, air supplied through tire inflation fluid passageway 41 and exiting at the second end 53 thereof enters into the interior cavity portion 54 of the tubeless tire 55 and thereby directly inflates the tire 55. The tire inflation port may comprise a threaded bore 44 located in the wheel hub 45 adjacent to wheel hub mounting holes 61 that are configured to receive and be mounted upon respective threaded wheel axle mounting rod members, and preferably comprises a tapped hole that receives a correspondingly threaded tire pressure valve stem element 63.

Fluid passageway 41 may be take the form of a bore cast or journalled within spoke 43 or it may comprise a (preferably cast) passageway solid with and disposed along the rear surface of a spoke. The cross section of the spoke may be thicker at the rear or inward portion of the wheel, as shown in FIG. 3, to equalize the mass of the spoke with other spokes in which no bore is provided. By having the passageway cast integrally with the spoke along its rear surface, the mass distribution of the spoke is essentially the same as that of the other spokes, so that wheel remains balanced. Alternatively, all the spokes may have the same cross-section and a passageway may be provided in each spoke. However, only one passageway is ported to the rim and the hub, so that the passageways in the other spokes are effectively dummy passageways for wheel balancing purposes. A locking hub cover 65 or the like may serve to conceal the access port 51 at the hub portion of the wheel, thereby making the access port tamperproof.

As will be appreciated from the foregoing description, the present invention successfully solves the above-described problem of a visible, rim-mounted valve stem for inflating a customized wheel-mounted tire by replacing the customary valve stem with a tire inflation passageway which is integral with a spoke that connects the wheel hub to the wheel rim. In a preferred embodiment the wheel is a unitary cast structure, with the tire inflation passageway integrally cast as part of one of the spokes. The hub portion of the wheel has an inflation access port coupled with the tire inflation fluid passageway, thereby providing for the application of pressurized air to the fluid passageway, so that inflation air may be supplied to the interior of a tire mounted on the wheel rim and thereby control the tire pressure of the tire.

It is to be observed that the spoke-integral passageway of the present invention is not to be confused with other types of tire inflation hardware configurations, that use an auxiliary inflation coupling to provide couple a tire inflation port at the hub to the rim of the wheel. For example, the Deady U.S. Pat. No. 1,445,008 described the use of a flexible tube, the accessible end of which is connected to a seizure chain at the wheel hub. The flapping of a flexible hose and attendant chain in a custom spoke wheel configuration not only would detract from the customized appearance of the wheel but would be potentially damaging to itself and the wheel proper. For an illustration of other prior art wheel inflation configurations which employ an auxiliary tire inflation connection, but do not provide a hub-to-rim wheel inflation structure that is integral with a radial member (spoke) are described in the Bobard U.S. Pat. Nos. 4,298,047, Ash et al 2,298,333, Kraft 1,693,084, Hughes 1,404,960, Wahl 1,931,637 and McKonkie 3,134,419.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. A wheel supporting a tubeless tire on a vehicle, said tubeless tire having an exterior tread surface for contact with a road surface and an opposite, interior wall surface which is bounded by rim-engageable edge portions of said tubeless tire, said rim-engageable edge portions having diameters sized to enable said tubeless tire to fit upon a rim of said wheel, said wheel comprising:

a hub mountable upon a wheel support axle and having an air supply port with which an air supply valve may be coupled for supplying air through said air supply port;

a rim configured to engage said respective rim-engageable edge portions of said tubeless tire, so that said rim and said interior wall surface of said tubeless tire define an interior tubeless tire cavity that is inflated by air supplied thereto, said rim having an air inflation port which, with said tubeless tire being mounted on said rim, opens into said interior tubeless tire cavity; and a plurality of spokes which join said hub with said rim and locate said rim radially of said hub, and wherein one of said spokes includes an inflation passageway in the form of a hollow bore therethrough, said hollow bore extending from said air supply port of said hub to said air inflation port of said rim, said hollow bore having its dimensions bounded by surrounding material of said one of said spokes through which said hollow bore passes, such that interior dimensions of said inflation passageway from said air supply port of said hub to said air inflation port of said rim are interior dimensions of said hollow bore, and wherein said one of said spokes is integrally joined with said rim so that an air-tight seal is established between said hollow bore and said air inflation port of said rim.

2. A wheel according to claim 1, wherein said hub, rim and spokes of said wheel are cast together as a unitary cast wheel, with said hollow bore being integrally cast through said one of said spokes.

3. A wheel according to claim 2, wherein said hub has a plurality of mounting holes configured to receive and be mounted upon respective threaded wheel mounting rod members at the end of a wheel axle and wherein said air supply port comprises a hole formed in said hub between said mounting holes and configured to receive a valve stem of an air supply valve for applying air to said inflation passageway and thereby applying tire pressure to said tubeless tire mounted on the rim of said wheel.

4. A wheel according to claim 1, wherein each of plural ones of said spokes includes a hollow bore therethrough, with one of said hollow bores extending from said air supply port of said hub to said air inflation port of said rim, said one hollow bore having its dimensions bounded by surrounding material of said one of said spokes through which said one hollow bore passes, such that interior dimensions of said one hollow bore from said air supply port of said hub to said air inflation port of said rim are interior dimensions of said inflation passageway.

5. A wheel according to claim 1, wherein said one of said spokes has a thickness greater than thicknesses of others of said spokes, so that the mass distribution of said one of said spokes is essentially the same as that of said others of said spokes, thereby maintaining said wheel in a balanced condition.

6. A wheel supporting a tubeless tire on a vehicle, said tubeless tire having an exterior tread surface for contact with a road surface and an opposite, interior wall surface which extends between and terminates at wheel rim-engageable edge portions of said tubeless tire, said wheel rim-engageable edge portions having diameters sized to fit said tubeless tire upon a rim of said wheel, said wheel comprising:

a hub mountable upon a wheel support axle of said vehicle and having an air supply port configured to be fitted with an inflation air supply valve for supplying air through said air supply port;

a wheel rim configured to engage said respective wheel rim-engageable edge portions of said tubeless tire, so that said wheel rim and said interior wall surface of said tubeless tire define a bounding perimeter of an interior tubeless tire inflation cavity that is inflated by air supplied thereto, said wheel rim having an air inflation port passing therethrough which, with said tubeless tire being mounted on said wheel rim, opens into said interior tubeless tire cavity; and a plurality of spokes which join said hub with said wheel rim and locate said wheel rim radially of said hub, and wherein one of said spokes includes an inflation passageway in the form of a hollow bore therethrough, said hollow bore extending from said air supply port of said hub to said air inflation port of said wheel rim, said hollow bore having its dimensions bounded by surrounding material of said one of said spokes through which said bore passes, such that interior dimensions of said inflation passageway from said air supply port of said hub to said air inflation port of said wheel rim are interior dimensions of said hollow bore, and wherein said one of said spokes is integrally joined with said wheel rim, so that an air-tight seal is established between said hollow bore and said air inflation port of said wheel rim.

7. A wheel according to claim 6, wherein said hub, rim and spokes of said wheel are cast together as a unitary cast wheel, with said hollow bore being integrally cast through said one of said spokes.

8. A wheel according to claim 7, wherein said hub has a plurality of mounting holes configured to receive and be mounted upon respective threaded wheel mounting rod members at the end of a wheel axle and wherein said air supply port comprises a hole formed in said hub between said mounting holes and configured to receive a valve stem for applying air to said inflation passageway thereby providing tire pressure to said tubeless tire mounted on said wheel rim.

9. A wheel according to claim 6, wherein each of plural ones of said spokes includes a hollow bore therethrough, one of said hollow bores extending from said air supply port of said hub to said air inflation port of said wheel rim, said one hollow bore having its dimensions bounded by surrounding material of said one of said spokes through which said one hollow bore passes, such that interior dimensions of said one hollow bore from said air supply port of said hub to said air inflation port of said wheel rim are interior dimensions of said inflation passageway.

10. A wheel according to claim 6, wherein said one of said spokes has a thickness greater than thicknesses of others of said spokes, so that the mass distribution of said one of said spokes is essentially the same as that of said others of said spokes, thereby maintaining said wheel in a balanced condition.

* * * * *